United States Patent [19]

Ohren

[11] Patent Number: 4,666,065
[45] Date of Patent: May 19, 1987

[54] LIQUID MEASURING AND POURING DEVICE
[75] Inventor: Tom H. Ohren, Cincinnati, Ohio
[73] Assignee: The Procter & Gamble Company, Cincinnati, Ohio
[21] Appl. No.: 879,874
[22] Filed: Jun. 30, 1986
[51] Int. Cl.$^4$ .................... B67D 1/16; G01F 11/26
[52] U.S. Cl. ................... 222/109; 222/158; 222/424; 222/442; 222/454; 222/478; 222/564; 222/571
[58] Field of Search ............. 222/108, 109, 158, 159, 222/424.5, 442, 454–457, 478, 479, 481, 547, 564, 568, 571, 584, 424, 129; 221/288

[56] References Cited

U.S. PATENT DOCUMENTS

| | | | |
|---|---|---|---|
| 547,862 | 10/1895 | Platt | 222/456 |
| 570,759 | 11/1896 | Law | 222/456 |
| 1,066,127 | 7/1913 | Lewis | 222/455 |
| 2,056,170 | 10/1936 | Deschner | 222/109 |
| 2,114,587 | 4/1938 | Bowker | 222/455 |
| 2,121,424 | 6/1938 | Colombo | 222/455 |
| 2,122,906 | 7/1938 | Baum | 222/424 UX |
| 2,208,862 | 7/1940 | Stringfellow | 222/457 X |
| 2,370,820 | 3/1945 | Stott | 222/454 |
| 2,511,493 | 6/1950 | Cerruti | 222/457 X |
| 2,584,130 | 2/1952 | Huebl et al. | 222/455 |
| 2,619,263 | 11/1952 | Duggan | 222/454 |
| 2,667,290 | 1/1954 | McPhee | 222/454 X |
| 2,678,757 | 5/1954 | McPhee | 222/454 X |
| 2,760,692 | 8/1956 | Buehlig | 222/455 X |
| 2,793,790 | 5/1957 | Kahler | 222/109 |
| 3,148,801 | 9/1964 | Radeloff et al. | 222/424 X |
| 3,193,160 | 7/1965 | Veit et al. | 222/109 X |
| 3,235,143 | 2/1966 | Goodrich | 222/454 |
| 3,254,809 | 6/1966 | Breneman | 222/454 X |
| 3,347,420 | 10/1967 | Donoghue | 222/129 |
| 3,396,875 | 8/1968 | Finch | 222/456 |
| 4,061,253 | 12/1977 | Rockefeller | 222/442 |
| 4,078,700 | 3/1978 | Hidding | 222/109 |
| 4,079,859 | 3/1978 | Jennings | 222/454 X |
| 4,116,371 | 9/1978 | Towns et al. | 222/455 |
| 4,151,934 | 5/1979 | Saeki | 222/437 |
| 4,183,450 | 1/1980 | Downing et al. | 222/455 |
| 4,550,862 | 11/1985 | Barker et al. | 222/109 |

FOREIGN PATENT DOCUMENTS

| | | | |
|---|---|---|---|
| 142210 | 7/1951 | Australia | 222/455 |
| 2802210 | 7/1979 | Fed. Rep. of Germany | 222/456 |
| 1053204 | 2/1954 | France | 222/571 |
| 361110 | 11/1931 | United Kingdom | 222/109 |
| 665182 | 1/1952 | United Kingdom | 222/454 |
| 701768 | 12/1953 | United Kingdom | 222/454 |

OTHER PUBLICATIONS

Twin-Neck Measuring Bottle—Packaging News & Trends, Nov. 1985.

Primary Examiner—Joseph J. Rolla
Assistant Examiner—Kevin P. Shaver
Attorney, Agent, or Firm—Richard C. Witte; John V. Gorman

[57] ABSTRACT

A passive liquid measuring and pouring device adapted for mounting on the open mouth of a liquid container. The measuring and pouring device includes an attachment transition adapted to attach the device in sealing relationship to the open mouth of the liquid container. The attachment transition provides fluid communication between the container and the liquid measuring and pouring device. The device further includes a measuring reservoir having a predetermined volume, and has an inlet port located adjacent its uppermost portion when in its upright position, and a drain hole located near its lowermost portion. The drain hole provides fluid communication between the measuring reservoir and the liquid container. A substantially vertical liquid filling channel provides direct fluid communication between the inlet port of the measuring reservoir and the attachment transition. A dispensing tube has its proximal end attached to the measuring reservoir and is oriented upwardly away from the measuring reservoir at a predetermined angle such that the distal end thereof provides an extended pouring spout for the device. The length and orientation angle of such dispensing tube is sufficient to prevent spillage of liquid held within the measuring reservoir from such dispensing tube when the device is in its upright position. Vents are formed in the device for allowing air to enter the liquid container during liquid measuring and dispensing procedures. A drip collection device adjacent the distal end of the dispensing tube insures mess control. The drip collection device includes drain-back openings for returning residual liquid to the liquid container. A closure is also provided for sealing the measuring and pouring device.

15 Claims, 8 Drawing Figures

LIQUID MEASURING AND POURING DEVICE

TECHNICAL FIELD

This invention relates to liquid measuring and pouring devices, and, more particularly, to a passive measuring and pouring device adapted for mounting on the open mouth of a liquid container for mess-free measuring and dispensing of predetermined volumes of such liquid.

BACKGROUND ART

Liquid products often require the measurement of predetermined volumes for proper usage. For efficiency and convenience, it is desirable to provide the consumer with simple and mess-free means of measuring and dispensing correct doses of liquid products. To achieve these tasks, various liquid dispensing packages and measuring the pouring devices have been utilized in the past.

As an example, U.S. Pat. No. 2,619,263, which issued to W. H. Duggan on Nov. 25, 1952, shows a liquid measuring and pouring attachment designed to be placed in the open outlet neck of a liquid container. In particular, the Duggan device includes an inlet tube mounted within an attachment sleeve and extending upwardly to the top of a measuring receptacle, such inlet tube then being cured upon itself and having its open distal end located near the lower portion of the receptacle. The inlet tube includes a vent/drain hole located near the outlet of the receptacle, and directs liquid from the container into the measuring receptacle. During measurement procedures, the outlet of the receptacle is oriented in an upward manner while the distal end of the inlet tube is oriented in a downward manner into the measuring receptacle chamber. Liquid entering the measuring receptacle eventually closes off the vent/drain hole thereby causing the liquid flow therewithin to stop. The container and attached receptacle are then turned 180° about the axis of the inlet tube to dispense the measured liquid through the outlet of the receptacle.

A measuring and dispensing device similar to the Duggan attachment is disclosed in U.S. Pat. No. 547,862, which issued to J. H. Platt on Oct. 15, 1895. The Platt device includes an inlet tube which provides fluid communication between the liquid container and a measuring chamber. The measuring chamber includes an outlet neck which is situated vertically above the inlet port of the inlet neck so that liquid entering the measuring chamber will close off the inlet port prior to reaching the level of the outlet neck. Following measuring procedures, the container and its attached device are rotated approximately 90° thereby dispensing the measured liquid through the outlet neck.

Another measuring and dispensing device is shown in U.S. Pat. No. 2,584,130, which issued to C. G. Huebl et al. on Feb. 5, 1952. The Huebl et al. reference discloses a device including a filler tube which extends from the neck of a liquid container into a measuring chamber. The device also includes a separate dispensing chamber connected to an outlet spout. The device is to be attached to the neck of the liquid container and, upon inversion, liquid flows through the filler tube into the measuring chamber. When in-flowing liquid covers the open end of a vent tube extending from such measuring chamber into the liquid container, the flow of liquid stops. Upon returning the dispensing device to its upright position, the liquid in the measuring chamber is transferred to a dispensing chamber. Upon subsequent inversion, the liquid in the dispensing chamber is dispensed via the outlet spout, while a new dose of liquid is measured simultaneously into the measuring chamber.

Other examples of measuring and dispensing devices similar to Huebl et al. can be found in U.S. Pat. Nos. 1,066,127 and 2,144,587, which issued to C. S. Lewis and R. P. Bowker on July 1, 1913 and Apr. 19, 1938, respectively. Both of these patents disclose measuring devices having upper measuring chambers connected to a liquid container by an inlet tube which includes an air vent. Upon inversion of the liquid container and its connected measuring device, liquid flows from the container into such upper measuring chamber until the air vent is covered by the rising liquid level. Upon returning the container to its original upright position, liquid within such upper measuring chamber flows into a lower secondary compartment. Such secondary compartment is connected to an outlet port, and upon subsequent inversion, the liquid held within the secondary compartment is dispensed via such outlet port while a new dose of liquid product is simultaneously measured into the upper chamber.

A dispensing bottle is disclosed in U.S. Pat. No. 2,370,820, which issued to H. R. Stott on Mar. 6, 1945. The Stott bottle includes an integral measuring compartment within its upper sections, whereby the bottle can be inverted to fill such measuring compartment. Upon return of the bottle to its original upright position, excess liquid within the measuring compartment returns to the main compartment of the bottle. Thereafter the liquid held within the measuring compartment can be dispensed by tilting the bottle toward its outlet. A similar dispensing container having an integral measuring compartment formed therewithin is shown in U.S. Pat. No. 3,235,143, which issued on Feb. 15, 1966 to W. J. Goodrich. Like the Stott bottle, the Goodrich container is tilted in a direction away from its outlet spout in order to measure a predetermined volume of liquid into its measuring compartment. Upon returning the container to its original upright position, excess liquid not retained within the measuring compartment is returned to the main compartment of the container. Thereafter, the measured liquid can be dispensed by tipping the container toward its outlet spout.

Despite all of the prior work done in the area of liquid measuring and dispensing, as evidenced by the vast array of measuring and dispensing devices described above, there remain problems of convenience, mess control and, reusability. For example, the prior art did not provide for drip prevention and/or return of residual liquid to the container. With many of the prior art devices, once the contained liquid was measured into the measuring compartment, there was no way to return such liquid to the main container if the consumer decided not to dispense such liquid. Moreover, if the consumer measured too much product into the measuring chamber, there was often no convenient way to return such excess liquid to the container prior to dispensing.

DISCLOSURE OF THE INVENTION

It is an object of this invention to obviate the above-described problems.

It is another object of the present invention to provide a passive liquid measuring and pouring device which provides maximum dispensing and mess control in a convenient and reusable manner.

It is yet another object of the present invention to provide a passive liquid measuring and pouring device adapted for mounting on the open mouth of a liquid container which provides convenient and mess-free measuring and dispensing of such liquid, with drain-back means for returning residual liquid to the primary liquid container.

In accordance with one aspect of the present invention, there is provided a passive liquid measuring and pouring device adapted for mounting on the open mouth of a liquid container. The measuring and pouring device includes an attachment transition which is adapted to attach the device in sealing relationship to such open mouth of the liquid container, with such attachment transition providing fluid communication between the mouth of the container and the liquid measuring and pouring device. The device further includes a measuring reservoir having a predetermined volume, and having an inlet port located adjacent its uppermost portion when in its upright position, and a drain hole located near its lowermost portion. The drain hole provides fluid communication between the measuring reservoir and the liquid container. A liquid filling channel provides direct fluid communication between the inlet port of the measuring reservoir and the attachment transition, with such filling channel extending substantially vertically through the central portion of the device and being connected to the attachment transition at its lower end and to the inlet port adjacent its upper end. A dispensing tube has its inner end attached to the measuring reservoir and is oriented upwardly away from the measuring reservoir at a predetermined angle such that the distal end thereof provides an extended pouring spout for the device. The length and orientation angle of such dispensing tube is sufficient to prevent spillage of liquid held within the measuring reservoir from such dispensing tube during measuring procedures and when the device is in its upright position. Vent means formed within the device allows air to enter the liquid container during liquid measuring and dispensing procedures, and drip collection means adjacent the distal end of the dispensing tube insures maximum dispensing and mess control. The drip collection means includes a drain-back means for returning residual liquid to the liquid container. Closure means for sealing the measuring and pouring device are also provided.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION OF THE INVENTION

Figure 1:
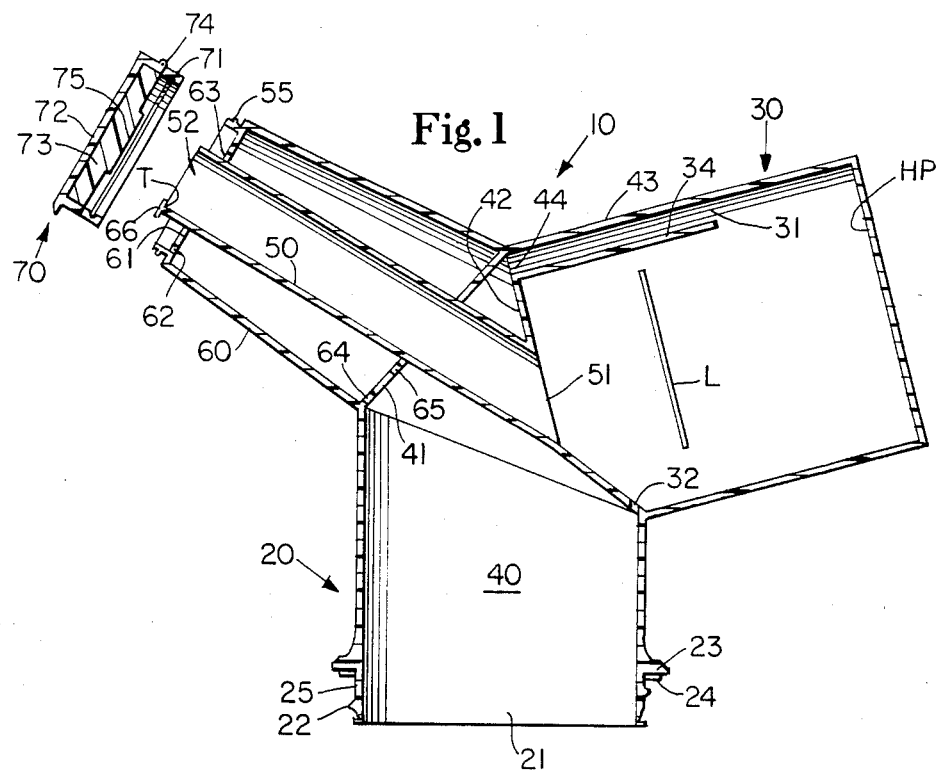
FIG. 1 is a partially exploded cross-sectional front elevational view of a liquid measuring and pouring device made in accordance with the present invention.

Referring now to the drawings in detail, wherein like numerals indicate the same elements throughout the views, a passive liquid measuring and pouring device 10 adapted for mounting on the open mouth of a liquid container is shown as comprising the combination of an attachment transition 20, a measuring reservoir 30, a liquid filling channel 40, and a dispensing tube 50. In the context of this disclosure, the term "passive" shall mean simply that the device includes no moving parts.

It is contemplated that liquid measuring and pouring device 10 can be fabricated from a variety of materials such as plastic, glass, metal or the like. While the materials chosen for the individual elements of the subject device are not critical, it is preferred that plastic materials be utilized for manufacturing ease, minimization of cost, and general practicality. In this regard, plastic materials, such as polyethylene, polypropylene, and the like, are good examples of plastic materials which could be used. Such material provides a relatively expensive, unbreakable, lightweight, and attractive device. While it is contemplated that liquid measuring and pouring device 10 be unitary upon completion, it is also contemplated that fabrication thereof will entail the assembly of a plurality of parts bonded or sealed together as appropriate.

FIG. 1 illustrates a cross-sectional view of liquid measuring and pouring device 10, for better understanding of the internal structure thereof. Attachment transition 20 is shown as further comprising an open lower end or orifice 21 defined by circumscribing wall 25. Formed on the external surface of circumscribing wall 25 are attachment means 22 for securing the measuring and pouring device 10 to the open mouth of a liquid container (not shown). Attachment means 22 are illustrated as being threads, however, other means of attachment (e.g. snap fitment arrangements, twist-lock mechanisms and the like) can be utilized. It is preferred that the attachment means 22 provide for convenient attachment of measuring and pouring device 10 to a liquid container, as well as providing reusability on other similar liquid containers. A sealing flange 23 extends outwardly about the periphery of circumscribing wall 25 creating a surface against which the upper portions of the open mouth of a liquid container can be sealed. Optionally, a sealing gasket 24 can also be included below sealing flange 23 to provide additional sealing tolerance to such attachment transition 20. Such additional sealing tolerance can also be especially advantageous to facilitate the proper orientation of device 10 on the open mouth of a liquid container, such orientation being described in greater detail below.

Liquid measuring and pouring device 10 further includes measuring reservoir 30. Measuring reservoir 30 is integrally attached adjacent its lowermost portion to the circumscribing wall 25 of attachment transition 20, and includes an inlet port 31 located adjacent its uppermost portion (e.g. uper wall 43) and a drain hole 32 located near its lowermost portion. Drain hole 32 provides constant direct fluid communication between measuring reservoir 30 and attachment transition 20 and the liquid container. Preferably, as illustrated in FIG. 1, portions of measuring reservoir 30 adjacent drain hole 32 are sloped toward such drain to facilitate collection of residual liquid therewithin for return to the liquid container. Measuring reservoir 30 further includes baffle 34 located adjacent inlet port 31. Baffle 34 is designed to facilitate containment of liquid which has been premeasured into reservoir 30 during the measurement procedures (which will be described in greater detail below). In particular, baffle 34 prevents liquid within measuring reservoir 30 from escaping via inlet port 31, as well as preventing the flow of liquid into measuring reservoir 30 from the liquid container (which might permit discharge of liquid in an amount beyond the premeasured volume) during dispensing procedures.

Measuring and pouring device 10 is illustrated in FIG. 1 in its upright position. Extending substantially vertically through the central portion of device 10 (when in such upright position) is liquid filling channel 40. Filling channel 40 provides fluid communication between inlet port 31 and attachment transition 20. In particular, filling channel 40 is connected to attachment transition 20 at its lower end and to inlet port 31 adjacent its upper end. Front channel wall 41, rear channel wall 42, and top wall 43 define the substantially vertical filling channel 40, with baffle 34 creating inlet opening 44 adjacent the upper portions of rear channel wall 42. It should be understood that while baffle 34 is shown as extending substantially parallel to upper wall 43, other configurations of such baffle, or a plurality of baffles, could equally be utilized to define inlet port 31 and help contain premeasured liquid within measuring reservoir 30 during dispensing procedures. For example, baffle 34 could depend from top wall 43 in a spaced relationship to right channel wall 42 (this alternative shown in FIG. 8—described below) to create a downwardly oriented inlet port (see inlet port 131 of FIG. 8). In this regard, the exact location and shape of baffle 34 is not critical; however, inlet port 31 is preferably located adjacent the uppermost portion of measuring reservoir 30 to provide for convenient measuring procedures and containment of liquid within measuring reservoir 30 prior to and during dispensing procedures, and to prevent the flow of liquid into measuring reservoir 30 via inlet port 31 during dispensing procedures.

A dispensing tube 50 is shown as having its proximal end 51 attached in a fluid communication with measuring reservoir 30. Dispensing tube 50 is preferably an elongated tube-like structure oriented upwardly and away from measuring reservoir 30 at a predetermined angle such that its distal end 52 provides an extended pouring spout for device 10. The exact length and orientation angle A of dispensing tube 50 is not critical; however, as will be shown in greater detail below, it is critical that the lowermost tip T of distal end 52 be situated vertically above the high point (HP) of the liquid level within measuring reservoir 30 such that following measuring procedures, and after the return of a liquid container and its measuring and pouring device 10 to upright position (e.g. if dispensing procedures are interrupted after measuring but prior to actual dispensing), liquid held within measuring reservoir 30 and dispensing tube 50 does not spill from the distal end 52 of dispensing tube 50. Such length and orientation angle must also be sufficient to prevent liquid from being dispensd via dispensing tube 50 during liquid measuring procedures.

Circumscribing and spaced outwardly from the outer periphery of dispensing tube 50 is drip collection means 60, illustrated in FIG. 1 as being a substantially cylindrical sleeve-like structure. Located slightly within the distal end of drip collection means 60 is collection wall 61. Formed in collection wall 61 below the distal end 52 of dispensing tube 50 is a drain-back orifice 62. Above distal end 52, a vent 63 is also formed in collection wall 61. Similarly, drain-back orifice 64 and vent 65 are formed in left channel wall 41. Together, drain-back orifices 62 and 64, and vents 63 and 65 provide for air flow into measuring and pouring device 10 and the liquid container during measuring and dispensing procedures, and for return of residual liquid to the liquid container following such procedures.

While the exact size and shape of such drain-back means and vents is not particularly critical, their sizes should be chosen to be small enough to minimize the outward passage of liquid during venting operations and large enough to provide sufficient in-flow of air during measuring and dispensing procedures to minimize glugging. These desires must be balanced in any particular design. Such drain-back means and vents must also be designed to prevent liquid from being directly dispensed during measuring procedures, as such would compromise the measuring and pouring device's usefulness as a mess-free system. In this regard, these openings might be sized and situated such that rising liquid within measuring reservoir 30 during measuring procedures effectively blocks the entry of venting air, thereby ceasing the flow of additional liquid into reservoir 30. As an example, these drain-back means and vents might preferably have an approximate diameter of 0.0625 inches (about 1.6 mm) for a measuring and dispensing device designed to measure approximately ½ cup (approximately 0.12 liters) of liquid product, permitting approximately four seconds for measuring and four seconds for dispensing. While exact location of such drain-back orifices and vents can be chosen as discussed, it is preferred that drain-back orifices 62 and 64 can be located adjacent the lower inner surfaces of drip collection means 60 to minimize trapped residual liquid therewithin.

It is also preferred that a flow control/antidrip protuberance or finger 66 be attached adjacent the distal end of dispensing tube 50 and extend somewhat therebeyond to direct residual liquid to drip collection means 60 and collection wall 61. While other flow control and/or drip-prevention structures could equally be formed on the distal end 52 of dispensing tube 50 (e.g. an antidrip lip or edge), it has been found that one or more flow control/antidrip fingers 66 provides superior capture and return of such residual liquid. In this regard, it is important to insure that when dispensing device 10 is in upright position, the outermost tip of flow control antidrip finger 66 does not extend beyond the outermost perimeter or edge of drip collection means 60. Residual liquid captured by finger 66 will therefore drip into the drip collection means 60 for return to the liquid container. One or more flow control/antidrip fingers 66 have also been found to provide accurate liquid flow control during low-flow dispensing procedures, such as for precise direction of product for pretreating of laundry and the like. Drip collection means 60 is further illustrated as including closure attachment means 55 formed about its outer distal surface. Such attachment means can comprise threads, snap-fitment arrangements, frictional interaction, or the like, and is chosen to correspond with closure means (if any) utilized with device 10.

FIG. 1 illustrates an exemplary closure means 70 contemplated for attachment to the distal end of drip collection means 60. In particular, closure means 60 includes a substantially cylindrical attachment means 71 designed to sealingly engage attachment means 55 (e.g. by adhesive, friction attachment or threads), a closure lid 72 being attached by hinge 74 to cylindrical attachment means 71, and an internal closure seal 73 including a dispensing tube plug 75. Closure seal 73 and plug 75 can be integral, and can be made of relatively resilient material to facilitate sealing dispensing tube 50 and drip collection means 60. In this way, measuring and pouring device 10 can be sealed for storage, shipping, etc. Closure means 70 is illustrated merely as an example of the virtually unlimited array of closure structures which could be equally utilized. In this regard, other simpler twist-on or snap-on arrangements could easily be substituted for the more permanently attached hinged means described herein.

Figure 2:
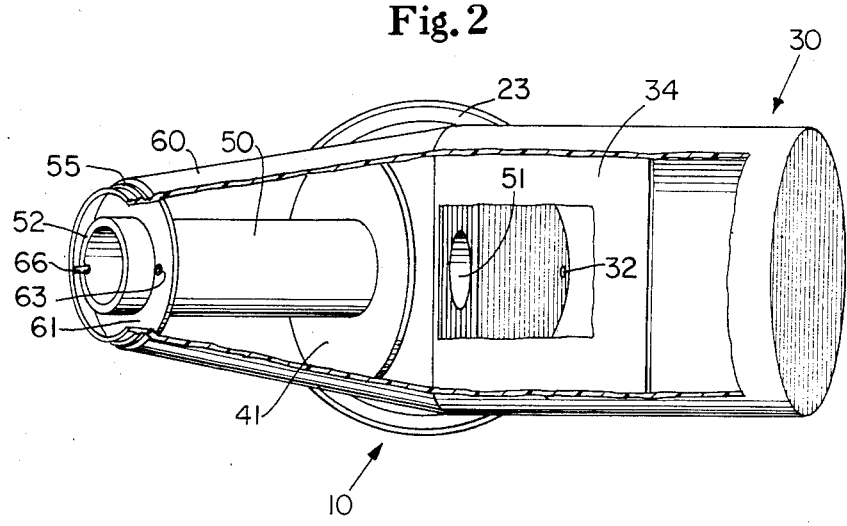
FIG. 2 is a partially broken away top plan view of the liquid measuring and pouring device of FIG. 1.
Figure 3:
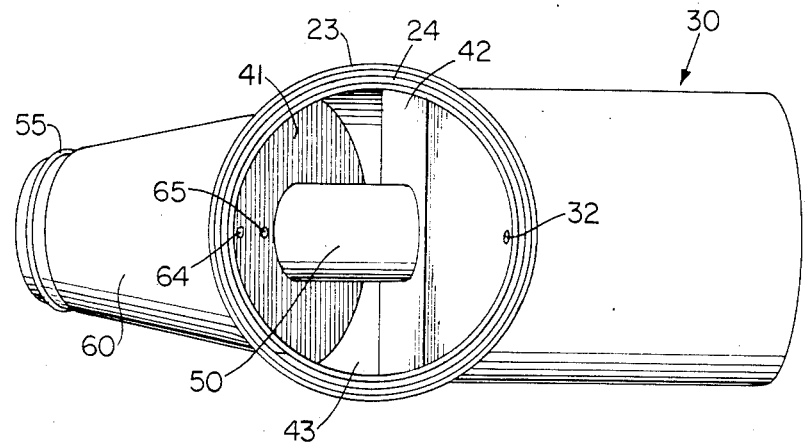
FIG. 3 is a bottom plan view of the device of FIG. 1.
Figure 4:
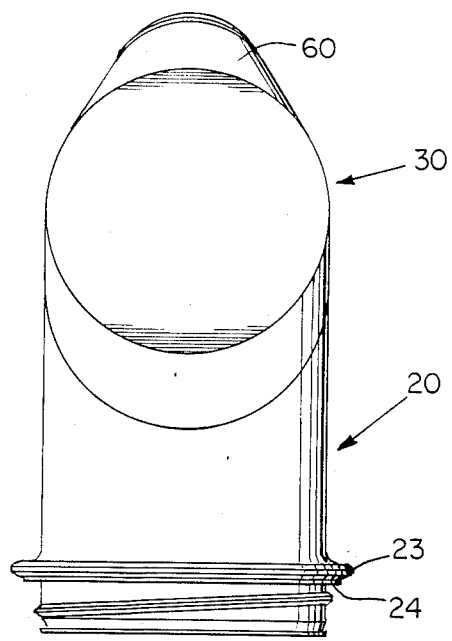
FIG. 4 is a right side view of the device of FIG. 1.

FIGS. 2 through 4 illustrate various additional views of the measuring and pouring device 10 described above with respect to FIG. 1, and are included to more fully illustrate a preferred example of the device of the subject invention. In particular, it can be seen that attachment transition 20 is a substantially cylindrical unit, as are measuring reservoir 30, dispensing tube 50 and drip collection means 60. A portion of FIG. 2 has been broken away to reveal detail of the inner structures of device 10.

Figure 5:
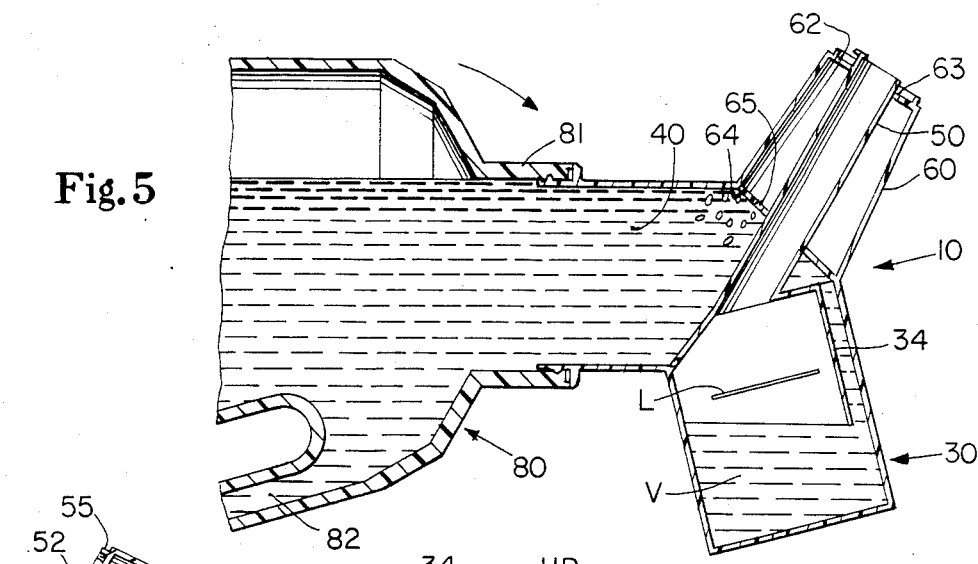
FIG. 5 is a partial cross-sectional view of the liquid measuring and pouring device of FIG. 1 attached to the open mouth of a liquid container, and illustrating the liquid measuring procedure.

It is contemplated that because (as will be shown below) the orientation of measuring and pouring device 10 vis-a-vis a handled container may be critical, orientation means (not shown) might also be required on device 10 to insure proper orientation of distal end 52 of dispensing tube 50 with regard to the liquid container upon which device 10 is mounted. For example, measuring and pouring device 10 should desirably be oriented such that distal end 52 of dispensing tube 50 is oriented substantially opposite to the handle (if any) of a liquid container. Similar orientation might also be required for liquid containers having non-symmetrical body shapes so that measuring and dispensing procedures can be conveniently undertaken. Any means of insuring such proper orientation can be utilized, such as the matching of attachment threads of attachment transition 20 and the open mouth of the liquid container, as described in commonly owned U.S. Pat. No. 4,550,862, which issued to Dale E. Barker et al. on Nov. 5, 1985; the disclosure of such patent being hereby incorporated herein by reference. An illustration of such orientation with regard to a handled bottle 80 is shown in FIG. 5 of the present disclosure. As mentioned above, a sealing gasket 24 may increase the margin of sealing tolereance at the connection between a liquid container and a measuring and dispensing device as described herein. Such tolerance may be required to allow for manufacturing differences commonly encountered in reusable devices, especially twist-on or screw-on arrangements.

Figure 6:
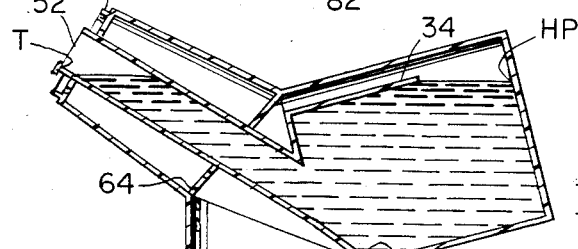
FIG. 6 is a partial cross-sectional view of the liquid measuring and pouring device of FIG. 3 shown subsequent to the measuring procedure where the liquid container and device have been returned to their upright position.
Figure 7:
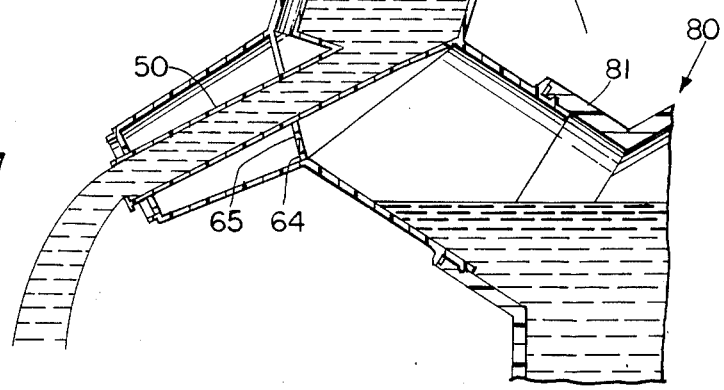
FIG. 7 is a partial cross-sectional view of the liquid measuring and pouring device of FIG. 4 shown in dispensing position.

FIGS. 5 through 7 illustrate partial cross-sectional views of a liquid measuring and pouring device 10 (shown without a closure structure for simplicity) attached to the open mouth 81 of a liquid container 80. In particular, FIG. 5 illustrates the combined container 80 and measuring and pouring device 10 when oriented in measuring position. Device 10 is illustrated as being threadedly attached to open mouth 81 of container 80, and container 80 includes an integral handle 82.

It is contemplated that to measure a predetermined dose of liquid product, liquid container 80 would be rotated from upright position approximately 90° or more in order to orient the measuring reservoir 30 in a downward position (such as shown in FIG. 5). When so rotated, FIG. 5 illustrates that liquid flows through liquid filling channel 40 and into measuring reservoir 30 via inlet port 31. During such time, drain-back orifices 62 and 64, and vents 63 and 65 allow the entrance of ambient air to replace liquid flowing from container 80 into measuring reservoir 30. Due to the relatively small size of such orifices and vents, incoming air will preclude the outward flow of all but insignificant amounts of liquid product during such measuring procedures. Again, it is important that sufficient venting air be provided to the interior of liquid container 80 during measuring operations to insure smooth flow of liquid with minimal "glugging".

It is preferred that at least measuring reservoir 30 be formed of material which is transparent or translucent so that the consumer will be able to visually monitor the filling operations to insure proper premeasuring of the liquid product into measuring reservoir 30. Additionally, measuring reservoir 30 might also comprise one or more level indicator indicia to facilitate accurate measuring of a desired predetermined partial dose of such liquid. Level line L is illustrated in FIG. 1 as an example of an indicator indicia, possibly indicating ½ or ¾ of a full dose (e.g. ¼ cup of ⅜ cup level for a ½ cup measuring reservoir 30).

In this regard, it is preferred that measuring reservoir 30 define a predetermined volume such that a consistent and accurate dose of produce can be measured and dispensed each time. As the liquid product enters measuring reservoir 30, its internal volume V allows a predetermined amount of such liquid to flow thereinto. When the volume of liquid within measuring reservoir 30 reaches equilibrium with the remaining liquid in container 80, liquid flow stops as does the air venting in through orifice 64 and vent 65. As mentioned above, proper design of size and location of orifice 64 and vent 65 can also be incorporated to stop liquid flow by cutting off the vent air as liquid rises to a predetermined level within reservoir 30.

It is contemplated that the premeasured dose of liquid product held within measuring reservoir 30 after such measuring procedures will normally be almost immediately dispensed, by rotating container 80 and attached device 10 to dispensing position, as illustrated in FIG. 7. However, should the user be interrupted or otherwise decide not to dispense such liquid product at that time, upon return of container 80 to upright position (see FIG. 6), product within reservoir 30 would begin to slowly drain back into container 80 via the drain hole 32. Additionally, upon being returned to upright position, liquid within inlet port 31 and the upper portions of filling channel 40 are returned directly to the interior of liquid container 80, and any liquid which has flowed outwardly through orifice 64 and/or vent 65 is returned to container 80 via orifice 64. It is important that the lowermost tip T of dispensing tube 50 be located vertically above the high point (HP) of liquid contained within measuring reservoir 30 when in such upright position in order to prevent spillage of the premeasured liquid from dispensing tube 50. In this way, the consumer has a convenient way of returning the measured liquid product to container 80 if, for any reason, the dose of product were not to be dispensed substantially immediately. This drain-back feature also can minimize inadvertent spillage of product should a subsequent user not notice that a dose of product had been premeasured, and allows for the return of residual liquid within device 10 to be returned to container 80. If a consumer decided to dispense after drain back had begun, a full premeasured dose could be insured by simply repeating the measuring procedure illustrated in FIG. 5 and described above.

As mentioned, FIG. 7 illustrates the dispensing operation, wherein container 80 and its attached measuring and pouring device 10 are rotated toward the distal end 52 of dispensing tube 50 to dispense liquid product held within measuring reservoir 30. Following such dispensing operations, subsequent measuring and dispensing operations can be undertaken, or the container can be returned to its upright position for storage with or without application of closure 70 thereto. Again, during such storage between uses, residual liquid is returned to container 80 via the drip collection means (e.g. antidrip finger 66, drip collection means 60, and drain-back orifices 62 and 64) and the drain hole 32.

It should also be noted that while generally only a small amount of liquid will pass outwardly through drain-back orifice 64 and vent 65 during various measuring and pouring operations, the presence of collection wall 61 near the distal end of collection means 60 also serves to minimize the escape from measuring and pouring device 10 of whatever liquid has passed through orifice 64 and vent 65. This feature provides an extra safeguard to facilitate mess-free use of the device, especially in cases where the device is not properly used (for example if the container 80 and device 10 were held for long periods of time in the dispensing position of FIG. 7 such that abnormal amounts of liquid product passed outwardly through orifice 64 and/or vent 65). It is also contemplated that other means of preventing such liquid from escaping through drip collection means 60 could equally be utilized. For example, an alternative to collection wall 61 could be the use of one or more retainer baffles formed within drip collection means 60 to impede the outflow of liquid therethrough, while retaining the drain-back features (see retainer baffle 168 of FIG. 8).

Figure 8:
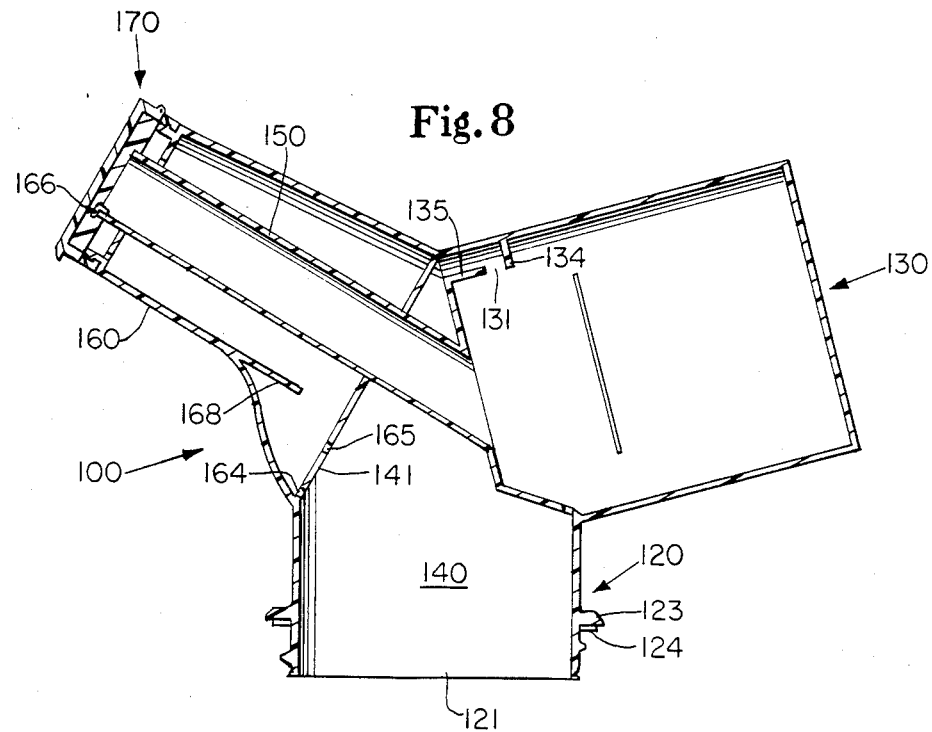
FIG. 8 is a cross-sectional front elevational view of an alternate embodiment of a liquid measuring and pouring device made in accordance with the present invention.

An example of an alternative embodiment of a liquid measuring and pouring device 100 made in accordance with the present invention is illustrated in FIG. 8. In particular, device 100 includes an attachment transition 120 having a lower orifice 121, sealing flange 123 and gasket 124, a measuring reservoir 130, a liquid filling channel 140 having a front channel wall 141, a dispensing tube 150, drip collection means 160, and closure means 170; these elements all corresponding to those similar elements of device 10 described above. However, device 100 does not include a collection wall corresponding to the collection wall 61 of device 10. Instead, device 100 includes a residual liquid retainer baffle 168 designed to contain residual liquid and/or liquid product passing outwardly through either drain-back orifice 164 or vent 165. As mentioned above, device 100 also illustrates an alternate arrangement of baffles 134 and 135 which define inlet port 131. This arrangement of baffles is shown simply as another example of the virtually unlimited ways in which at least one baffle can be arranged adjacent the inlet port to help contain liquid within the measuring reservoir and to prevent flow of liquid from the liquid container into the measuring reservoir during dispensing procedures. The device 100 is also shown with an alternate form of the flow control/antidrip feature (as described above with reference to element 66). In particular, flow control/antidrip finger 166 is illustrated as being attached to the interior surface of the distal end of dispensing tube 150 and extending outwardly beyond the distal end in a hook-shape.

Having shown and described the preferred embodiment of the present invention, further adaptions of the liquid measuring and pouring device can be accomplished by appropriate modifications to the structures thereof by one of ordinary skill in the art without departing from the scope of the present invention. For example, the subject measuring and pouring device could be adapted to co-dispense two or more separate liquids simultaneously. In this regard, to dispense two liquids, a measuring and pouring device made in accordane herewith could be divided by an internal divider wall, having the resulting separate portions of such device in fluid communication with separate liquid products held within a liquid container. In addition, the respective sides of the measuring reservoir of such a device could be independently sized to simultaneously dispense different volumes of the separate liquids. Accordingly, the scope of the present invention should be considered in terms of the following claims and is understood not to be limited to the details of structure and operation shown and described in the specifications and drawings.

I claim:

1. A passive liquid measuring and pouring device adapted for mounting on the open mouth of a liquid container, said liquid measuring and pouring device having an upright position, a measuring position, and a pouring position, said device comprising in combination:
   (a) an attachment transition adapted to attach said device in sealing relationship to said open mouth of a liquid container, said attachment transition providing fluid communication between said mouth and said liquid measuring and pouring device;
   (b) a measuring reservoir having a predetermined volume, said measuring reservoir further having an inlet port located adjacent its uppermost portion when said device is in its upright position, and a drain hole located near its lowermost portion, said drain hole providing fluid communication between said measuring reservoir and said liquid container to drain substantially all the liquid in the measuring reservoir after a measuring procedure not immediately followed by a dispensing procedure;
   (c) a liquid filling channel providing direct fluid communication between said inlet port and said attachment transition when in said measuring position; said filling channel extending substantially vertically through said device when said device is in the upright position, and being connected to said attachment transition at its lower end and to said inlet port adjacent its upper end;
   (d) a dispensing tube having its proximal end attached in fluid communication with said measuring reservoir and being oriented upwardly away from said measuring reservoir at a predetermined angle such that its distal end provides an extended pouring spout for said device, the length and orientation angle of said dispensing tube being sufficient to prevent spillage of liquid held within said measuring reservoir from said dispensing tube when said device is in its upright position;

(e) vent means for allowing air to enter said liquid container when in said measuring and pouring positions;

(f) drip collection means adjacent the distal end of said dispensing tube, said drip collection means including drain-back means for returning residual liquid to said liquid container; and (g) closure means for sealing said measuring and pouring device.

2. The liquid measuring and pouring device of claim 1, wherein said measuring reservoir further comprises at least one baffle adjacent said inlet port to help contain liquid within such measuring reservoir when in said pouring position.

3. The liquid measuring and pouring device of claim 2, wherein said drip collection means further comprises a collection reservoir substantially circumscribing the distal end of said dispensing tube.

4. The liquid measuring and pouring device of claim 3, wherein said attachment transition comprises attachment means formed on its exterior surface adapted to cooperate with corresponding internal attachment means adjacent the open mouth of said liquid container.

5. The liquid measuring and pouring device of claim 4, wherein said attachment means of said attachment transition comprises threads.

6. The liquid measuring and pouring device of claims 4 or 5, wherein said drip collection means further comprises at least one antidrip finger attached adjacent the distal end of said dispensing tube and extending beyond said distal end to direct residual liquid to said collection reservoir following a dispensing procedure.

7. The liquid measuring and pouring device of claim 6, wherein said measuring reservoir further comprises means for providing visual access to the liquid level therewithin, and one or more filling level indicia to facilitate accurate measuring of a desired predetermined volume of such liquid.

8. A passive liquid measuring and pouring device adapted for mounting on the open mouth of a liquid container, said liquid measuring and pouring device having an upright position, a measuring position, and a pouring position, said device comprising in combination:

(a) an attachment transition adapted to attach said device in sealing relationship to said open mouth of a liquid container, said attachment transition providing fluid communication between said mouth and said liquid measuring and pouring device;

(b) a measuring reservoir having a predetermined volume, said measuring reservoir further having an inlet port located adjacent its uppermost portion when said device is in its upright position, at least one baffle adjacent said inlet port to help contain liquid within the measuring reservoir, and a drain hole located near its lowermost portion, said drain hole providing fluid communication between said measuring reservoir and said liquid container to drain substantially all the liquid in the measuring reservoir after a measuring procedure not immediately followed by a dispensing procedure;

(c) a liquid filling channel providing direct fluid communication between said inlet port and said attachment transition when in said measuring position; said filling channel extending substantially vertically through said device when said device is in the upright position, and being connected to said attachment transition at its lower end and to said inlet port adjacent its upper end;

(d) a dispensing tube having its proximal end attached in fluid communication with said measuring reservoir and being oriented upwardly away from said measuring reservoir at a predetermined angle such that its distal end provides an extended pouring spout for said device to facilitate accurate pouring of such measuring liquid, the length and orientation angle of said dispensing tube being sufficient to prevent spillage of liquid held within said measuring reservoir from said dispensing tube when said device is in its upright position;

(e) vent means for allowing air to enter said liquid container when in said measuring and pouring positions;

(f) drip collection means adjacent the distal end of said dispensing tube, said drip collection means including a collection reservoir substantially circumscribing the distal end of said dispensing tube and drain-back means for returning residual liquid to said liquid container; and (g) closure means for sealing said measuring and pouring device.

9. The liquid measuring and pouring device of claim 8, wherein said attachment transition comprises attachment means formed on its exterior surface adapted to cooperate with corresponding internal attachment means adjacent the open mouth of said liquid container.

10. The liquid measuring and pouring device of claim 9, wherein said attachment means of said attachment transition comprises threads.

11. The liquid measuring and pouring device of claims 9 or 10, wherein said drip collection means further comprises at least one antidrip finger attached adjacent the distal end of said dispensing tube and extending beyond said distal end to direct residual liquid to said collection reservoir following a dispensing procedure.

12. The liquid measuring and pouring device of claim 11, wherein said measuring reservoir further comprises means for providing visual access to the liquid level therewithin, and one or more filling level indicia to facilitate accurate measuring of a desired predetermined volume of such liquid.

13. A passive liquid measuring and pouring device adapted for mounting on the open mouth of a liquid container, said liquid measuring and pouring device having an upright position, a measuring position, and a pouring position, said device comprising in combination:

(a) an attachment transition having attachment means formed on its exterior surface adapted to cooperate with corresponding internal attachment means adjacent the open mouth of a liquid container to attach said device in sealing relationship thereto, said attachment transition providing fluid communication between said mouth and said liquid measuring and pouring device;

(b) a measuring reservoir having a predetermined volume said measuring reservoir further having an inlet port located adjacent its uppermost portion when said device is in its upright position, at least one baffle adjacent said inlet port to help contain liquid within the measuring reservoir, and a drain hole located near its lowermost portion, said drain hole providing fluid communication between said measuring reservoir and said liquid container to drain substantially all the liquid in the measuring reservoir after a measuring procedure not immediately followed by a dispensing procedure;

(c) a liquid filling channel providing direct fluid communication between said inlet port and said attachment transition when in said measuring position; said filling channel extending substantially vertically through said device when said device is in the upright position, and being connected to said attachment transition at its lower end and to said inlet port adjacent its upper end;

(d) a dispensing tube having its proximal end attached in fluid communication with said measuring reservoir and being oriented upwardly away from said measuring reservoir at a predetermined angle such that its distal end provides an extended pouring spout for said device to facilitate accurate pouring of such measured liquid, the length and orientation angle of said dispensing tube being sufficient to prevent spillage of liquid held within said measuring reservoir from said dispensing tube when said device is in its upright position;

(e) vent means for allowing air to enter said liquid container when in said measuring and pouring positions;

(f) drip collection means adjacent the distal end of said dispensing tube, said drip collection means including a collection reservoir substantially circumscribing the distal end of said dispensing tube and drain-back means for returning residual liquid to said liquid container, and said drip collection means further comprising at least one antidrip finger attached adjacent the distal end of said dispensing tube and extending beyond said distal end to direct residual liquid to said collection reservoir following a dispensing procedure; and (g) closure means for sealing said measuring and pouring device.

14. The liquid measuring and pouring device of claim 13, wherein said attachment means of said attachment transition comprises threads.

15. The liquid measuring and pouring device of claim 14, wherein said measuring reservoir further comprises means for providing visual access to the liquid level therewithin, and one or more filling level indicia to facilitate accurate measuring of a desired predetermined volume of such liquid.

* * * * *